E. W. SHAW.
AIR HOSE COUPLING.
APPLICATION FILED JULY 1, 1909.
957,385.
Patented May 10, 1910.
2 SHEETS—SHEET 1.
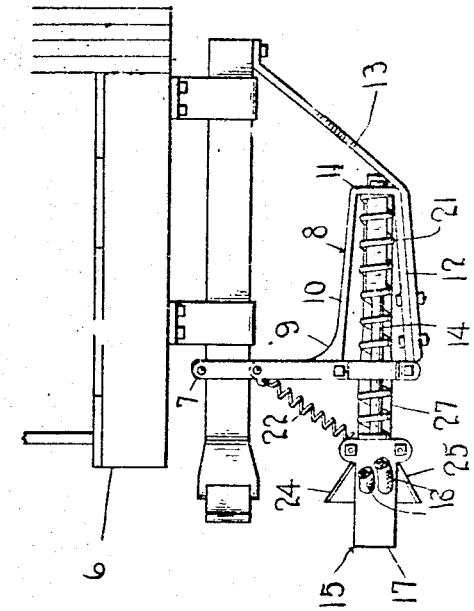
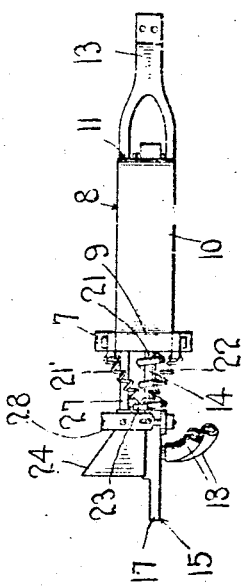
FIG. 1.
FIG. 2.
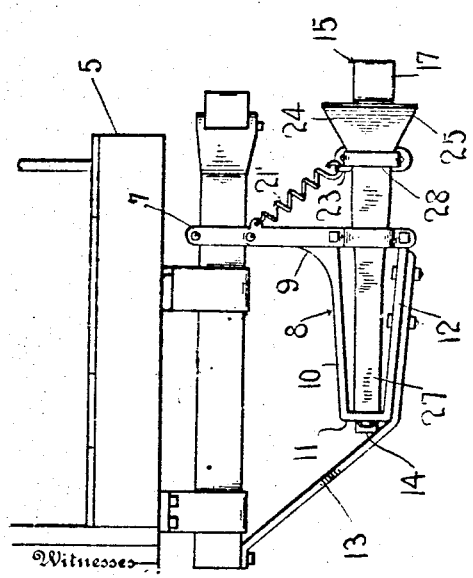
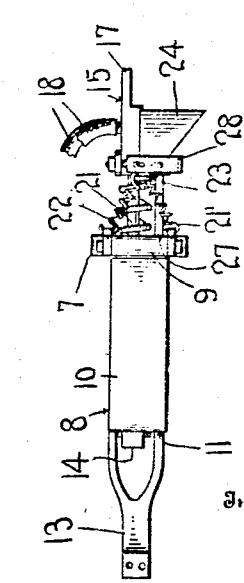
Witnesses
L. B. James
John A. Donegan
Inventor
Eugene W. Shaw
By Chandler & Chandler
Attorneys

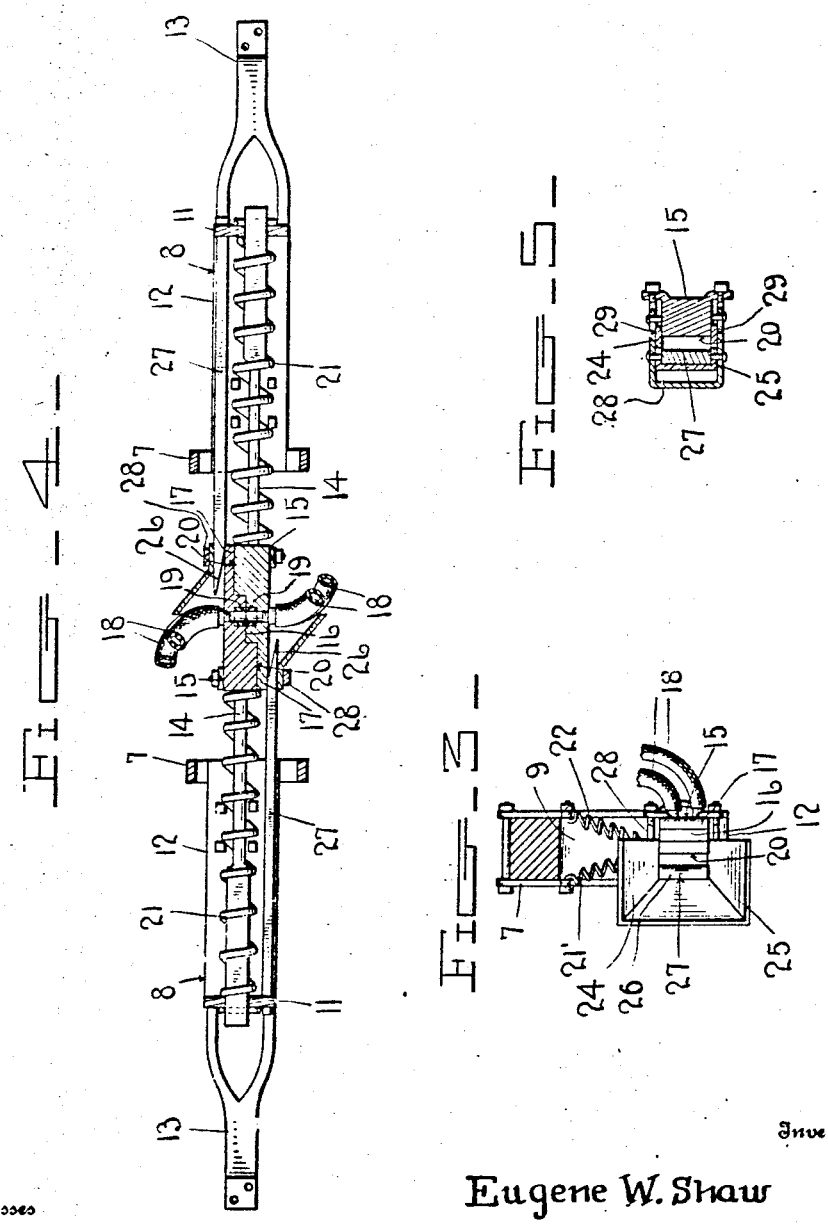

UNITED STATES PATENT OFFICE.

EUGENE W. SHAW, OF WEIR, KANSAS.

AIR-HOSE COUPLING.

957,385.  Specification of Letters Patent.  Patented May 10, 1910.

Application filed July 1, 1909. Serial No. 505,444.

*To all whom it may concern:*

Be it known that I, EUGENE W. SHAW, a citizen of the United States, residing at Weir, in the county of Cherokee, State of Kansas, have invented certain new and useful Improvements in Air-Hose Couplers; and I do hereby declare the following to be a full, clear, and exact description of the invention, such as will enable others skilled in the art to which it appertains to make and use the same.

This invention relates to improvements in car couplings and more particularly to the type employed for automatically coupling the air brake hose.

The invention consists in an improvement on my former air brake hose coupling, granted to me by Letters Patent, dated September 10, 1907, and Number 865,615. In that patent a coupling is shown consisting of a pair of draw heads arranged at the ends of a pair of adjacent cars, the draw heads carrying the air brake hose, and the parts being so arranged that when the draw heads are brought together by the act of coupling the cars, the parts in each draw head leading from the end of the hose will be brought into registration with the corresponding port in the opposite draw head, whereby the hose ends will be placed in communication with each other and securely clamped. In that patent gaskets were disposed on the inner faces of the draw head and surrounding the air ports, and it was found that during the coupling of the hose that the friction between these gaskets, caused by one sliding on the other, soon reduced their usefulness. The present invention therefore aims to remedy this defect by providing a coupling wherein the gaskets will be prevented from sliding one upon the other during the coupling operation until the air ports are in alinement with each other when each draw head will be moved laterally so as to bring the gaskets squarely together.

One object of the invention is the provision of an improved form of draw head.

Another object is the provision of an improved form of bracket for carrying the draw head.

A further object is the provision of an improved form of clamping bar, which is designed to bear laterally on the adjacent draw head and force the gasket of the latter into engagement with the opposite gasket.

With these and other objects in view as will more fully hereinafter appear, the present invention consists in certain novel details of construction and arrangement of parts, hereinafter fully described, illustrated in the accompanying drawings and more particularly pointed out in the appended claims, it being understood that various changes in the form, proportion, size and minor details of the device may be made without departing from the spirit or sacrificing any of the advantages of the invention.

In the accompanying drawings forming part of the specification:—

Figure 1 is a side elevation of the parts in position ready to be coupled. Fig. 2 is a top plan view of the same. Fig. 3 is a front view of one of the draw heads and the bracket and guide. Fig. 4 is a sectional plan view of the parts coupled. Fig. 5 is a transverse section view of one of the draw heads and its parts.

Similar numerals of references are employed to designate corresponding parts throughout.

As shown in the drawings the adjacent ends of the cars are designated in general by the numerals 5 and 6. Depending from the lower face and disposed at one end of each car is a stirrup 7. This member is arranged slightly to one side of the longitudinal center of the car, and supports a bracket 8. The latter is preferably formed of a single piece of metal, oblong in shape and of a width corresponding to the distance between the side arms of the stirrup, or substantially so. This bracket is so formed that one end portion 9 bears on the rear faces of the sides of the stirrup and is suitably secured thereto, and extends downwardly to a point adjacent the outwardly curved portions of the stirrup sides. At this point it is bent rearwardly and at right angles to the vertical portion as shown at 10, and extends for a considerable distance in a direction parallel with the length of the car ending in a downwardly directed extension or back 11, which extends to a point a trifle above the plane of the lower end of the stirrup. The metal of the bracket from the back 11 is bent at substantially right-angles thereto and extends forwardly as shown at 12, to a point in alinement with the lower end of the stirrup, to which it is secured, as clearly shown in the drawings. The bracket is further held supported by means of rearwardly extending braces 13, the forward ends of which are secured to the lower ends of the stirrups and the opposite ends of which extend rearwardly and upwardly and are secured to the lower face of the floor of the car. With this construction it will be seen that the bracket is firmly supported by means of the stirrups and braces.

By referring now to the drawings it will be seen that the draw bar is supported by the bracket. This member is preferably formed of a single piece of metal and is provided with an elongated shank portion 14, to one end of which is secured the central portion of the rear end of the draw head 15. The latter on its inner face is under-cut or rabbeted to provide a stepped surface 16, the outer step of which constitutes a tongue 17. The intermediate step is provided with a pair of transverse openings arranged in a vertical plane and extending to opposite sides of the step, the nipples on the air pipes 18 are designed to be fitted into the outer ends of these openings while the opposite or inner ends of the openings, on the inner face of the head are counterbored to receive a suitable gasket 19. The inner step is designated by the numeral 20, and extends to the inner end of the head. The shank 14 of the draw bar extends through the back 11 and is held against extreme forward movement by means of a cotter or the like. Surrounding that portion of the shank 14 between the forward face of the back 11 and rear end of the draw head is a helical spring 21, and in order to maintain the draw head in central position when uncoupled, a pair of springs 21′ and 22 are employed, the lower ends of which are connected to an eye bolt or the like 23, disposed at the central portion of the upper side of the draw head, and the upper ends of which are connected to the upper end portions of the sides of the stirrup. Thus it can be seen that the draw head is yieldingly held for lateral and longitudinal movement.

A flared guide or socket is disposed over the stepped surface of the draw head, and in the present instance this member is shown to be formed of a single piece of sheet metal or the like and is of a length substantially equal to the length of the draw head. This member is so formed that it will provide a housing for the draw head on the adjacent car and in carrying out this construction the opposite longitudinal sides 24 and 25 of the member are bent inwardly and at right-angles. The distance between these bent portions corresponds to the height of the draw head, and the width of the portions is equal to about two-thirds of the greatest thickness of the head, or substantially so. In positioning the guide, the bent portions 24 and 25 are placed astride the upper and lower sides of the rear step 20 of the draw head, so that the longitudinal edges of the bent portions will be in a plane with the face of the intermediate step, while the rear end of the guide will be substantially flush with the rear end of the draw head. With this construction it is obvious that a space will exist between the face of the inner step 20 and inner face of the guide which will be equal to twice the thickness of the tongue 17, or substantially so. That portion of the guide in advance of the rear step 20 is flared as shown at 26.

Disposed in the space between the lower step 20 and inner face of the guide is one end of what subsequently will be termed a clamping bar 27, the opposite end of which is rigidly secured to the back 11 of the guide. The thickness of the latter is considerably less than the width of the space, and at its forward end or that end disposed within the space is provided on its inner face or that face disposed adjacent the inner step 20 with a beveled surface. The length of this beveled surface corresponds to the length of the inner step 20 or approximately so, and in the normal position of the parts when they are uncoupled the upper extremity of this beveled surface will be in alinement with the forward or outer end of the inner step 20, or approximately so.

The guide is secured to the draw head by means of a U shaped clamp strap 28, which embraces the rear end portion of the guide and has its opposite terminals projecting in advance of the outer face of the draw head and reduced to form studs which are screw threaded for the reception of suitable nuts. The opposite arms of the straps are provided with elongated openings 29, which receive suitable pins projecting vertically from the upper and lower faces of the draw head. With this construction it is obvious that any wear or stretching of the clamp strap may be taken up by tightening the nuts.

From the foregoing description the operation of the device will be readily understood when it is understood that the draw heads are of such length that they will project considerably in advance of the coupling members for the car. Thus when the adjacent ends of two cars are brought together the tongues 17 will first enter the spaces between the guides, as the adjacent ends are brought nearer together the forward ends of the steps will be brought into engagement with each other, this will force the draw heads rearwardly and also force the tongues over the clamping bars, whereby the beveled ends of the latter will enter farther into the space between the guides and draw heads. As this movement continues the tongues of the draw heads will be wedged in the spaces between the beveled surfaces by the clamping bars and inner steps, whereby each draw head will be moved laterally until the air ports are in alinement and the gaskets surrounding the same brought to bear one upon the other, thus providing an air-tight joint.

From the foregoing it can be seen that I have provided a device which is exceedingly simple in structure and comparatively inexpensive to manufacture and the relative longitudinal movement of the draw head and clamp bar positively insuring a successful coupling each time the parts are brought together.

Having thus described my invention what is claimed as new, is:—

1. In an air hose coupling, a bracket having a clamp bar combined therewith, and a draw head yieldingly held for longitudinal movement within the bracket.

2. In an air hose coupling, a bracket, a clamping bar combined with the bracket, a draw head adapted for longitudinal movement within the bracket and relative to the clamping bar.

3. In an air hose coupling, a draw head having on one side a stepped surface, a guide disposed over and spaced from said stepped surface and a clamping bar having one end portion disposed in the space between said guide and draw head.

4. In an air hose coupling, a bracket, a longitudinally movable draw head yieldingly held supported within said bracket, a guide combined with the draw head and disposed over and spaced from one face of the latter, a clamping bar combined with the bracket and having one end disposed in the space between the guide and draw head.

5. In a car coupling, a vertically disposed support, a rearwardly extending bracket combined with said support, a longitudinally movable draw head combined with said bracket, a guide combined with said draw head and disposed over and spaced from one face of the latter, and a clamping bar having one end secured to the bracket and its opposite end disposed in the space between the guide and the draw head.

In testimony whereof, I affix my signature, in presence of two witnesses.

EUGENE W. SHAW.

Witnesses:
W. J. ALLEN,
W. A. DE LAPP.